Figure 1:
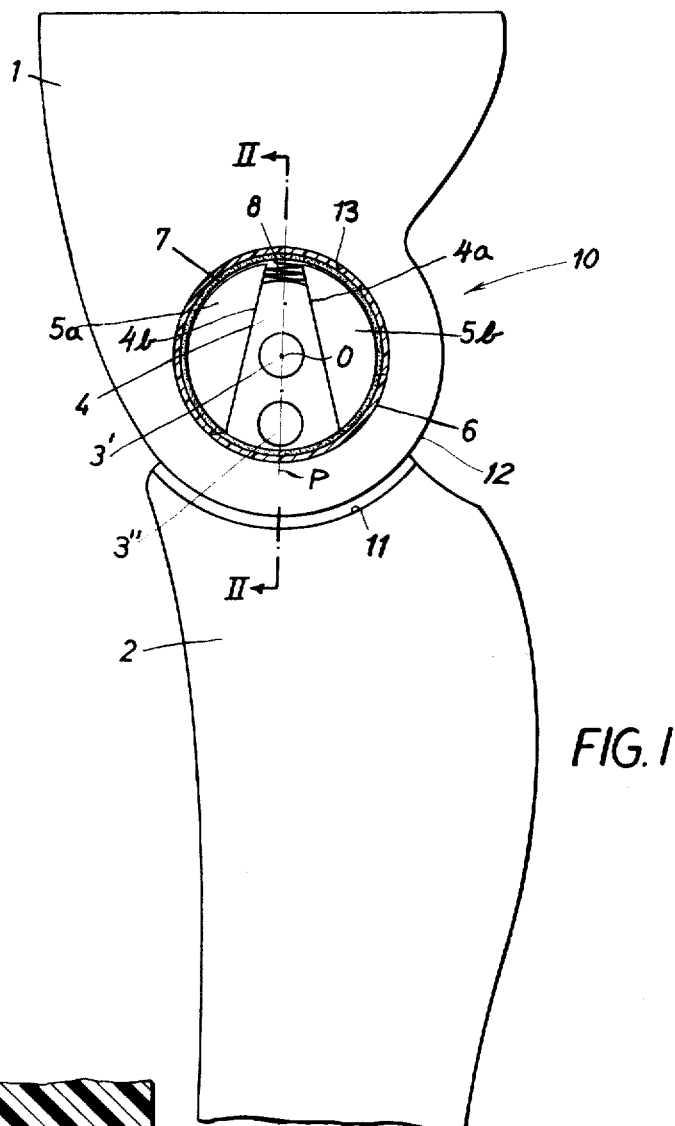

United States Patent
Ehbrecht

[15] 3,678,517
[45] July 25, 1972

[54] KNEE JOINT FOR PROSTHETIC APPLIANCE

[72] Inventor: Edwin Ehbrecht, 3429 Etzenborn 24, Germany

[22] Filed: Jan. 21, 1971

[21] Appl. No.: 108,480

[52] U.S. Cl. ................................................ 3/27, 3/12.2
[51] Int. Cl. ..................................... A61f 1/04, A61f 1/08
[58] Field of Search ..................................... 3/22–29, 2, 12, 3/12.2, 12.3

[56] References Cited

UNITED STATES PATENTS

| 2,575,802 | 11/1951 | Fisher et al. | 3/2 |
| 2,885,687 | 5/1959 | Kelsey | 3/26 |

FOREIGN PATENTS OR APPLICATIONS

| 163,720 | 10/1949 | Austria | 3/27 |
| 1,099,570 | 3/1955 | France | 3/22 |

Primary Examiner—Richard A. Gaudet
Assistant Examiner—Ronald L. Frinks
Attorney—Karl F. Ross

[57] ABSTRACT

An artificial leg with a thigh member and a shank member has an upwardly converging wedge fixedly secured to the shank member in a bearing cylinder rigid with the thigh member with interposition of two freely movable brake segments between the flanks of the wedge and the cylinder wall. When the weight of the user rests on the appliance, the cylinder is lowered so that the wedge spreads the brake segments to rigidify the limb; when the weight is off, a spring raises the cylinder relatively to the wedge which thereupon releases the brake segments from their cylinder-engaging position, thus allowing the shank to swing with reference to the thigh.

9 Claims, 2 Drawing Figures

PATENTED JUL 25 1972

3,678,517

Edwin Ehbrecht
Inventor.

By
Karl F. Ross
Attorney

KNEE JOINT FOR PROSTHETIC APPLIANCE

My present invention relates to a prosthetic limb, more specifically to an artificial leg wherein an upper thigh member and a lower shank member are swingably interconnected by a knee joint.

In such limbs it is desirable to lock the knee joint against relative rotation of the members when the user stands upright, placing his weight on the prosthetic appliance, yet to allow the lower member or shank to swing freely — within certain limits — when the weight is off, e.g. when the user is seated.

The general object of my invention is to provide simple and effective means for locking and unlocking the knee joint in response to body weight.

This object is realized, pursuant to my present invention, by the provision of a wedge element received in a cylindrical bore which is formed at the knee joint in one of the two leg members, e.g. the thigh, the wedge element being rigid with the other member (e.g. the shank) and co-operating with clamping means such as a pair of brake segments which are loosely inserted in the bore adjacent the wedge flanks for camming displacement thereby into engagement with the wall surface of the bore upon a relative vertical motion of the members due to a loading of the thigh by the weight of the user; for this purpose, the flanks of the wedge element converge in a vertical direction, specifically in the direction of weight-induced relative motion of the two members (i.e. upwardly if the wedge is carried on the shank). When the appliance is unloaded, the return shift of the members within their limited range of vertical mobility is advantageously assisted by a spring or equivalent biasing means acting upon the wedge element.

Figure 2:
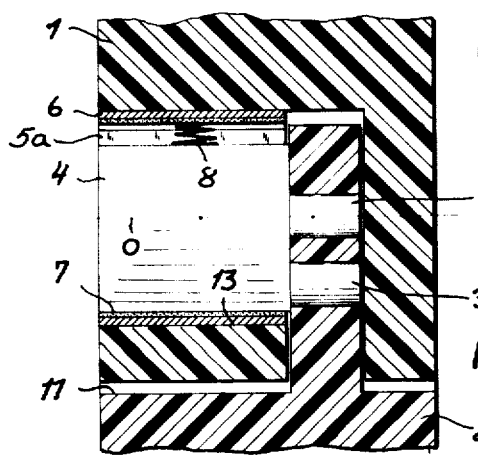

The above and other features of my invention will be described in detail hereinafter with reference to the accompanying drawing in which:

FIG. 1 is a side-elevational view of part of a prosthetic appliance including my improved knee joint; and FIG. 2 is a cross-sectional view taken on the line II — II of FIG. 1.

The prosthetic limb shown in the drawing comprises a thigh number 1 and a shank member 2 interconnected at a knee joint 10 with limited vertical mobility, the shank 2 forming a cradle 11 for a generally cylindrical head 12 of the thigh 1. This head has a bore 13 centered on a horizontal axis 0, the bore being provided with a fixed tubular liner 6 (e.g. of metal) advantageously carrying an inner friction layer 7 of the type conventionally used in brake linings. Within the bore 13 I dispose an upright wedge element 4 which is secured to an extension of shank 2 by a pair of parallel horizontal pins 3', 3" and whose flanks 4a, 4b lie on opposite sides of a vertical plane P including the axis 0. These flanks converge upwardly and are in contact with a pair of brake segments 5a, 5b whose edges remote from the wedge 4 are cylindrically curved with substantially the same radius as the inner wall surface of the bore, more specifically of brake lining 7; the broad lower face of wedge 4 also has the same curvature, as has the narrow upper tip thereof. Between this tip and the bore wall there is inserted a compression spring 8 tending to raise the tube 6 and thereby the thigh 1 with reference to the wedge and the shank 2.

In the unloaded position of the appliance, the lower face of wedge 4 is in light frictional contact with layer 7 and the brake segments 5a, 5b are loosely held between this wedge and the liner 6, 7; the shank 2 may then swing freely with reference to thigh 1, within limits defined by stops not shown.

When the user rests his weight on the appliance, shank 1 is depressed against the force of spring 8 so that wedge 4 rises within its bore, thereby spreading the brake segments 5a, 5b apart into locking engagement with friction layer 7.

Naturally, members 1 and/or 2 may be provided with cover plates or the like, not shown, holding the assembly 5a, 5b in position.

It will thus be seen that I have provided a compact construction for a knee joint exerting an effective clamping force upon its two relatively swingable members in response to a vertical loading pressure.

Naturally, the prosthetic limb here disclosed could also be used, with minor modifications, as an arm having two members interconnected by an elbow joint, so long as means (e.g. cables) are provided for relatively stressing these members toward each other.

I claim:

1. A prosthetic limb comprising a thigh member and a shank member interconnected by a knee joint with limited freedom of relative vertical motion, one of said members being formed at said knee joint with a cylindrical bore centered on a horizontal axis; a wedge element in said bore rigid with the other of said members, said wedge element having lateral flanks on opposite sides of a vertical plane through said axis, said flanks converging in the direction of relative motion of said other of said members upon a loading of said thigh member by the weight of a user; and clamping means loosely inserted in said bore adjacent said flanks for displacement thereby into engagement with the wall surface of said bore upon such weight-induced relative motion.

2. A prosthetic limb as defined in claim 1 wherein said other of said members is provided with a pair of parallel horizontal pins supporting said wedge element thereon.

3. A prosthetic limb as defined in claim 1 wherein said clamping means comprises a pair of brake segments with outer edges conforming to the curvature of said bore.

4. A prosthetic limb as defined in claim 3 wherein said bore is provided with a tubular liner surrounding said wedge element.

5. A prosthetic limb as defined in claim 4 wherein said liner includes a friction layer facing said brake segments.

6. A prosthetic limb as defined in claim 1, further comprising resilient biasing means urging said wedge element into a disengaged position against the direction of said weight-induced relative motion.

7. A prosthetic limb as defined in claim 6 wherein said biasing means comprises a compression spring inserted between the tip of said wedge element and the wall surface of said bore.

8. A prosthetic limb as defined in claim 1 wherein said wedge element has a broad end face cylindrically curved with substantially the radius of said bore.

9. A prosthetic limb comprising a first member and a second member interconnected by a joint with limited freedom of relative vertical motion, one of said members being formed at said joint with a cylindrical bore centered on a horizontal axis; a wedge element in said bore rigid with the other of said members, said wedge element having lateral flanks on opposite sides of a vertical plane through said axis, said flanks converging in the direction of relative motion of said other of said members upon a relative stressing of said members toward each other; and clamping means loosely inserted in said bore adjacent said flanks for displacement thereby into engagement with the wall surface of said bore upon such stress-induced relative motion.

* * * * *